United States Patent
Akama et al.

(10) Patent No.: US 10,969,240 B2
(45) Date of Patent: Apr. 6, 2021

(54) SYSTEMS AND METHODS FOR CONTROLLING VEHICLE SYSTEMS USING EXPERIENCE ATTRIBUTES

(71) Applicant: Honda Motor Co., Ltd., Tokyo (JP)

(72) Inventors: Shinichi Akama, Cupertino, CA (US); Shigeyuki Seko, Campbell, CA (US)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 16/193,073

(22) Filed: Nov. 16, 2018

(65) Prior Publication Data
US 2020/0158532 A1    May 21, 2020

(51) Int. Cl.
*G01C 21/36* (2006.01)
*B60W 40/08* (2012.01)

(52) U.S. Cl.
CPC . *G01C 21/3697* (2013.01); *B60W 2040/0872* (2013.01); *B60W 2540/221* (2020.02); *G01C 21/362* (2013.01); *G01C 21/3617* (2013.01)

(58) Field of Classification Search
CPC .......... G01C 21/3697; G01C 21/3415; B60W 2040/0872; B60W 2540/22; B60W 2540/221; B60W 60/0013; B60W 60/0021; B60W 40/08
See application file for complete search history.

(56) References Cited

U.S. PATENT DOCUMENTS

| | | | |
|---|---|---|---|
| 2011/0213511 A1* | 9/2011 | Visconti | B60W 40/09 701/1 |
| 2013/0226408 A1* | 8/2013 | Fung et al. | A61B 5/18 701/41 |
| 2014/0046595 A1* | 2/2014 | Segawa | G01C 21/34 701/541 |

(Continued)

FOREIGN PATENT DOCUMENTS

| | | | |
|---|---|---|---|
| DE | 102013205394 A1 * | 10/2014 | B60K 35/00 |
| JP | 2004093422 | 3/2004 | |

(Continued)

OTHER PUBLICATIONS

English Translation: Kloden, DE 102013205394-A1, Oct. 2014, German Patent Publication (Year: 2014).*

*Primary Examiner* — Nadeem Odeh
*Assistant Examiner* — Nicholas K Morgan
(74) *Attorney, Agent, or Firm* — Rankin, Hill & Clark LLP (57) ABSTRACT

The systems and methods described herein are generally directed to altering experience attributes. According to one aspect, a computer-implemented method for altering experience attributes based on a comparison of an estimated arrival time to a desired arrival time is provided. The method includes receiving logistical data for a trip of the vehicle occupant. The method also includes estimating an estimated arrival time based on navigation data. The method further includes determining that the estimated arrival time will (Continued)

occur at least a threshold amount of time after a desired arrival time. The method also includes identifying an experience attribute based on the determination that the estimated arrival time will occur at least the threshold amount of time after the desired arrival time. The method further includes altering a vehicle system based on the experience attribute.

18 Claims, 5 Drawing Sheets

(56) References Cited

U.S. PATENT DOCUMENTS

| | | | | |
|---|---|---|---|---|
| 2015/0328985 | A1* | 11/2015 | Kim | A61B 5/163 |
| | | | | 180/272 |
| 2016/0089954 | A1* | 3/2016 | Rojas Villanueva | |
| | | | | B60H 1/00742 |
| | | | | 701/36 |
| 2018/0012089 | A1* | 1/2018 | Ricci | B60L 50/53 |
| 2019/0049262 | A1* | 2/2019 | Grimm | G07C 5/008 |
| 2019/0061772 | A1* | 2/2019 | Prinz | A61B 5/747 |
| 2019/0146495 | A1* | 5/2019 | Yan | B60W 30/18154 |
| | | | | 701/26 |
| 2019/0276047 | A1* | 9/2019 | Suzuki | B60W 50/14 |
| 2019/0344805 | A1* | 11/2019 | Sakata | B60W 50/14 |
| 2020/0142407 | A1* | 5/2020 | Kozloski | G05D 1/0223 |

FOREIGN PATENT DOCUMENTS

| | | |
|---|---|---|
| JP | 2006010609 | 1/2006 |
| JP | 2015158469 | 9/2015 |

* cited by examiner

SYSTEMS AND METHODS FOR CONTROLLING VEHICLE SYSTEMS USING EXPERIENCE ATTRIBUTES

BACKGROUND

Navigation systems are increasingly integrated with vehicles. The navigation systems provide real-time traffic information to the vehicle occupant regarding driving conditions ahead, such as average roadway speeds, accidents, road construction, road closures, and the like. The real-time traffic information gives the vehicle occupant a better sense of what to expect on the trip. However, when the occupant is provided with an expectation that does not comport with the vehicle occupant's desired outcome, the vehicle occupant may become anxious, which can have a negative effect on the vehicle occupant's operation of the vehicle.

BRIEF DESCRIPTION

According to one aspect, a computer-implemented method for using experience attributes to control vehicle systems is provided. The method includes receiving logistical data for a trip of the vehicle occupant. The method also includes estimating an estimated arrival time based on navigation data. The method further includes determining that the estimated arrival time will occur at least a threshold amount of time after a desired arrival time. The method also includes identifying an experience attribute based on the determination that the estimated arrival time will occur at least the threshold amount of time after the desired arrival time. The method further includes altering a vehicle system based on the experience attribute.

According to another aspect, a system for using experience attributes to control vehicle systems includes a data receiving module, an estimation module, a determination module, and a control module. The data receiving module receives logistical data including a destination and a desired arrival time for a trip of a vehicle occupant. The estimation module estimates an estimated arrival time at the destination based on navigation data. The determination module determines that the estimated arrival time will occur at least a threshold amount of time after the desired arrival time. The control module identifies an experience attribute based on the determination and alters a vehicle system based on the experience attribute associated with the determination that the estimated arrival time will occur at least the threshold amount of time after the desired arrival time.

According to a further aspect, a non-transitory computer-readable storage medium stores instructions that, when executed by a computer, cause the computer to perform a method for vehicle system control using an experience attribute. The method includes receiving logistical data associated with a trip of the vehicle occupant. The method also includes estimating an estimated arrival time based on navigation data. The method further includes determining that the estimated arrival time will occur at least a threshold amount of time after a desired arrival time. The method includes altering a vehicle system based on an experience attribute associated with the determination that the estimated arrival time will occur at least the threshold amount of time after the desired arrival time.

DETAILED DESCRIPTION

Generally, the systems and methods disclosed herein are directed to using experience attributes to control vehicle systems. In particular, the systems and methods described herein address the anxiety of the vehicle occupant caused by the navigation system of the vehicle estimating the time of arrival occurring after the vehicle occupant's desired arrival time. The vehicle occupant's anxiety may be addressed by altering vehicle systems using the experience attribute. For example, an experience attribute may prevent the estimated arrival time from being displayed on a vehicle display of the infotainment system. As another example, an experience attribute may cause the audio system to play relaxing music.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to: display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant).

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Figure 1:
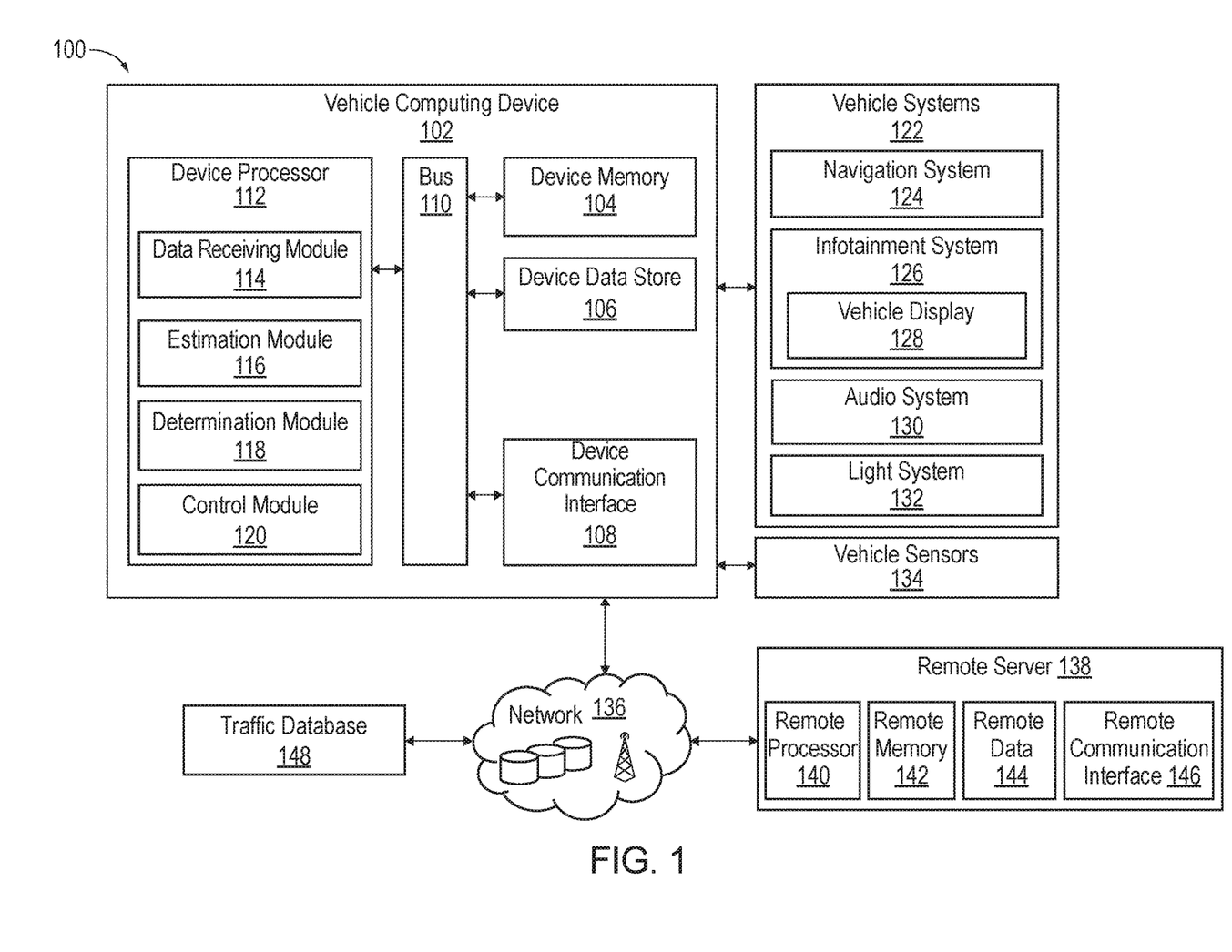
FIG. 1 is a schematic diagram of an operating environment for implementing systems and methods for using experience attributes to control vehicle systems according to an exemplary embodiment.
Figure 2A:
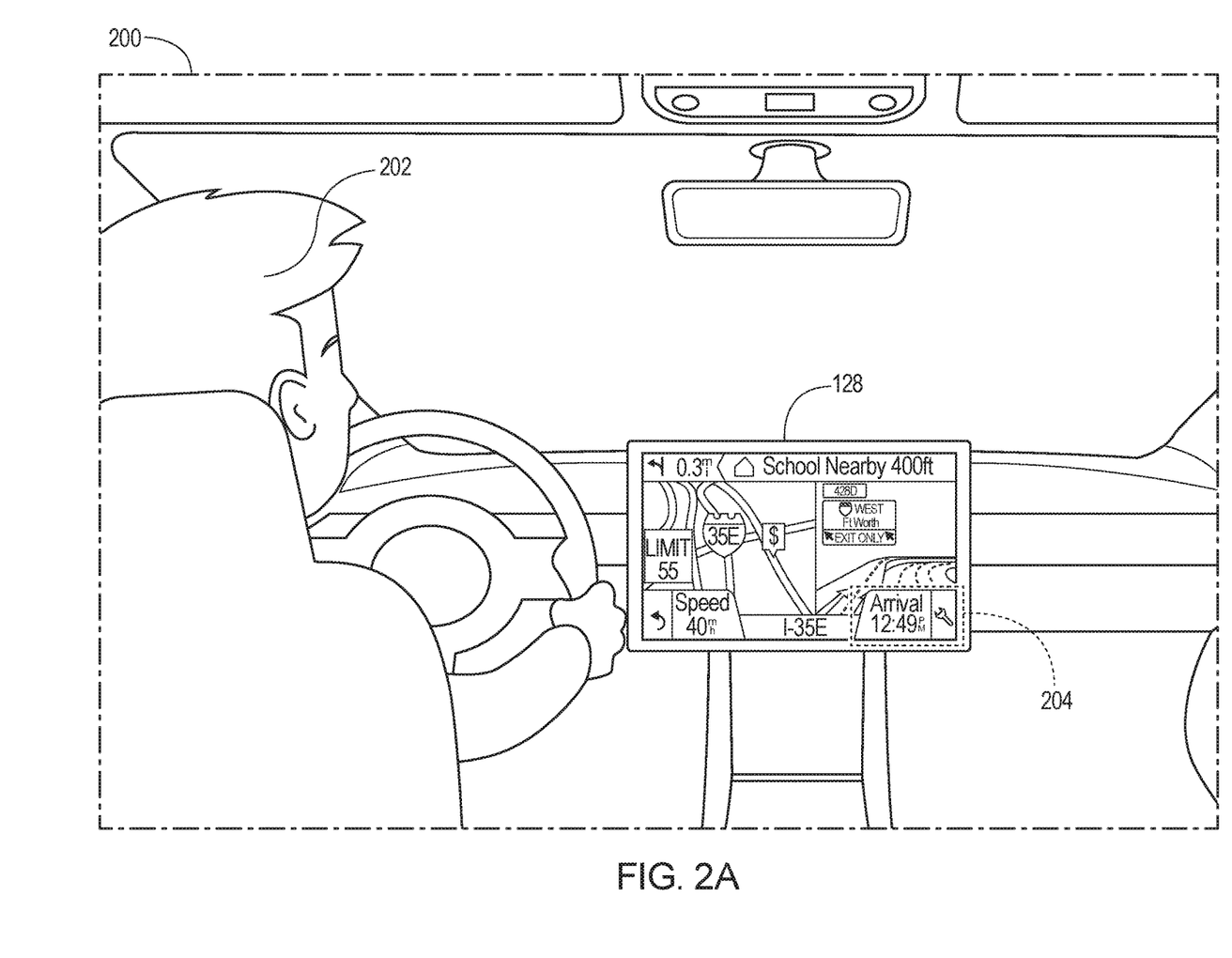
FIG. 2A is a schematic diagram of a vehicle display with an estimated arrival time according to an exemplary embodiment.
Figure 2B:
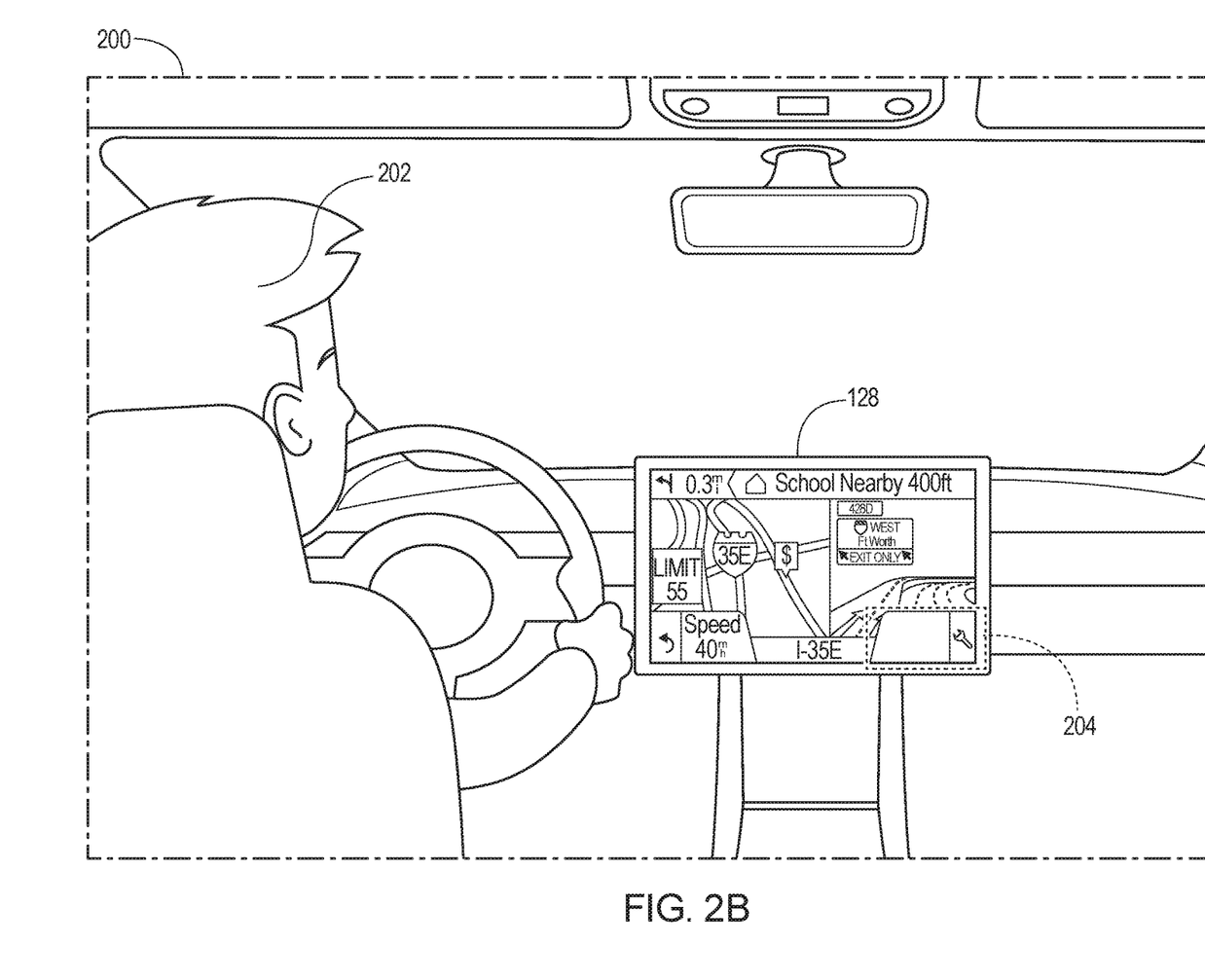
FIG. 2B is a schematic diagram of the vehicle display without an estimated arrival time according to an exemplary embodiment.

Referring now to the drawings, the showings are for purposes of illustrating one or more exemplary embodiments and not for purposes of limiting the same. FIG. 1 is a schematic diagram of an operating environment 100 for implementing systems and methods for experience attributes associated with vehicle systems. The components of operating environment 100, as well as the components of other systems, hardware architectures, and software architectures discussed herein, can be combined, omitted, or organized into different architectures for various embodiments. Furthermore, the components of the operating environment 100 can be implemented with or associated with a vehicle 200. For example, FIGS. 2A and 2B are schematic views of a vehicle 200 capable of presenting experience attributes to a vehicle occupant 202 according to an exemplary embodiment.

In the illustrated embodiment of FIG. 1, the operating environment 100 includes a vehicle computing device (VCD) 102 with provisions for processing, communicating and interacting with various components of the vehicle 200 and other components of the operating environment 100. In one embodiment, the VCD 102 can be implemented with the vehicle 200 (shown in FIGS. 2A and 2B), for example, as part of a telematics unit, a head unit, a navigation unit, an infotainment unit, an electronic control unit, among others. In other embodiments, the components and functions of the VCD 102 can be implemented remotely from the vehicle 200, for example, with a portable device (not shown) or another device connected via a network (e.g., a network 136).

Generally, the VCD 102 includes a device memory 104, a device data store 106, and a device communication interface 108, which are each operably connected for computer communication via a bus 110 and/or other wired and wireless technologies. The VCD 102 also includes a device processor 112 operably connected for computer communication via a bus 110 and/or other wired and wireless technologies. The device communication interface 108 provides software and hardware to facilitate data input and output between the components of the VCD 102 and other components, networks, and data sources, which will be described herein. Additionally, the device processor 112 includes a data receiving module 114, an estimation module 116, a determination module 118, and a control module 120, each suitable for controlling vehicle systems using experience attributes facilitated by the components of the operating environment 100.

The VCD 102 is also operably connected for computer communication (e.g., via the device communication interface 108 and/or the bus 110) to one or more vehicle systems 122. The vehicle systems 122 can include, but are not limited to, any automatic or manual systems that can be used to enhance the vehicle 200, driving, and/or safety. Here, the vehicle systems 122 include a navigation system 124, an infotainment system 126 having a vehicle display 128, an audio system 130, and a light system 132.

The navigation system 124 stores, calculates, and provides route and destination information and facilitates features like mapping and turn-by-turn directions. The infotainment system 126 provides visual information and/or entertainment and can include a vehicle display 128. The audio system 130 controls audio (e.g., audio content, volume) in the vehicle 200. The light system 132 controls interior lighting such as cabin lighting as well as exterior lights of the vehicle 200. The exterior lights may include vehicle headlight and turn signal control for controlling lighting (e.g., head lights, flood lights) and signaling devices (e.g., turn signals, blind spot indicators) mounted on various locations of the vehicle 200. The vehicle systems 122 are exemplary in nature and other vehicle systems, as well as more or fewer vehicle systems 122 can be implemented with the systems and methods discussed herein.

Referring again to FIG. 1, the vehicle systems 122 include and/or are operably connected for computer communication to various vehicle sensors 134. The vehicle sensors 134 provide and/or sense information associated with one or more vehicle occupants, such as the vehicle occupant 202, the vehicle environment, and/or the vehicle systems 122. The vehicle sensors 134 can include, but are not limited to, vehicle sensors 134 associated with the vehicle systems 122 and other vehicle sensors 134 associated with the vehicle 200. Specific vehicle sensors 134 can include, but are not limited to, vehicle speed sensors, door sensors, accelerator pedal sensors, brake sensors, throttle position sensors, wheel sensors, anti-lock brake sensors, camshaft sensors, and physiological sensors (e.g., monitoring sensors, heart rate sensors, blood pressure sensors, oxygen content sensors, respiratory sensors, perspiration sensors, imaging sensors to sense eye movement, etc.), among others.

The vehicle sensors 134 can also include, but are not limited to, cameras mounted to the interior or exterior of the vehicle 200 and radar and laser sensors mounted to the exterior of the vehicle 200. Further, the vehicle sensors 134 can include sensors external to the vehicle 200 (accessed, for example, via the network 136), such as external cameras, radar and laser based sensors on other vehicles in a vehicle-to-vehicle network, street cameras, surveillance cameras, and roadway sensors, among others.

The vehicle sensors 134 are operable to sense a measurement of data associated with the vehicle 200, the vehicle environment, the vehicle systems 122, and/or users of the vehicle, and generate a data signal indicating said measurement of data. These data signals can be converted into other data formats (e.g., numerical) and/or used by the vehicle systems 122 and/or the VCD 102 to generate other data metrics and parameters. The vehicle sensors 134 can be any type of sensor, for example, acoustic, electric, environmental, biomedical, optical, imaging, light, pressure, force, thermal, temperature, proximity, among others. The vehicle sensors 134 are exemplary in nature and other vehicle sensors, as well as more or fewer vehicle sensors 134 can be implemented with the systems and methods discussed herein.

The VCD 102 is also operatively connected for computer communication to the network 136 to at least one remote server, such as the remote server 138. The network 136 is, for example, a data network, the Internet, a wide area network or a local area network. The network 136 serves as a communication medium to various devices (e.g., databases, data stores, web servers, remote servers, application servers, intermediary servers, client machines, other portable devices).

Generally, the remote server 138 includes a remote processor 140, a remote memory 142, remote data 144, and a remote communication interface 146, which are each operably connected for computer communication. The connection from the device communication interface 108 to the remote communication interface 146 through the network 136 can be facilitated in various ways. For example, the connection may be made through a network connection (e.g., wired or wireless), a cellular data network from a portable device (not shown) or the remote server 138, a vehicle to vehicle ad-hoc network (not shown), an in-vehicle network (not shown), among others, or any combination of thereof. The remote server 138 may generally provide control data to the VCD 102 and receive control data from the VCD 102. The control data may include operational information about the vehicle 200 or one or more vehicle systems 122, the vehicle occupant 202, or the remote server 138.

The traffic database 148 can be located remotely from the VCD 102 and also accessed, for example, by the network 136. In some embodiments, the traffic database 148 could be located on-board the vehicle 200, at for example, the device memory 104 and/or the device data store 106 or integrated with the navigation system 124. Further, in some embodiments, the traffic database 148 could be located on the remote server 138. In other embodiments, the traffic database 148 could be distributed in one or more locations.

The traffic database 148 can include real-time traffic incident information regarding driving conditions ahead, such as average roadway speeds, accidents, road construction, road closures, disabled vehicles, and road debris, among others. The traffic database 148 can be used to determine information about a particular traffic pattern such as congestion distance and possible delay times. In some embodiments, the navigation system 124 may access the remote server 138 to calculate and provide more accurate route and destination information.

The operating environment 100 shown in FIG. 1 will now be described in operation according to an exemplary embodiment with reference to FIGS. 2A and 2B. As mentioned above, and as shown in detail in FIGS. 2A and 2B, the vehicle 200 is shown from the interior. The interior of the vehicle 200 includes the vehicle display 128. The interior of the vehicle may have a different configuration, arrangement, or style not shown in FIGS. 2A and 2B.

Returning to FIG. 1, as discussed above, the VCD 102 includes a device processor 112 having the data receiving module 114, the estimation module 116, the determination module 118, and the control module 120. The data receiving module 114 receives logistical data for a trip of the vehicle occupant 202. The logistical data identify, at least in part, a destination of the vehicle occupant 202 and a desired arrival time. For example, the logistical data may also include, but are not limited to, at least a portion of the route for the trip, an origin, address, coordinates, point of interest, one or more roadway names, or a waypoint. The logistical data may also include data related to an event, invitation, ticket, or other item associated with a time or location. For example, the logistical data may include a start time, appointment time, a time of departure, the duration of the trip, among others.

In one embodiment, the vehicle occupant 202 may manually input the logistical data into the infotainment system 126 using the vehicle display 128. In another embodiment, the vehicle occupant 202 may input the logistical data using a portable device (not shown) with an input device, such as a keypad, voice recognition, touch screen, etc. In some embodiments, the vehicle occupant 202 may interface with the data receiving module 114 using an application. The application may be instructions in execution on infotainment system 126 and/or the portable device, firmware, software in execution on the portable device, and/or combinations of each to perform a function(s) or an action(s), and/or to cause a function or action from another module, method, and/or system. For example, the vehicle occupant 202 inputting information, such as logistical data in a fillable form style. In another example, the logistical data may be entered using voice recognition. Accordingly, the vehicle occupant 202 may vocally list the logistical data to input the logistical data.

The data receiving module 114 may also generate a query for a remote server 138 associated with the vehicle occupant 202. The query includes a request for the logistical data such as the destination and a desired arrival time. The query may include instructions for accessing an electronic or online calendar, datebook, or social media, among others associated with the vehicle occupant 202. For example, the data receiving module 114 may access the calendar on the remote server 138 to determine if an event (e.g. appointment, meeting, date, party, etc.) is occurring and receive logistical data regarding the event. In this manner, remote server 138 can be accessed by the data receiving module 114 to harvest logistical data.

In some embodiments, a destination may be included in the logistical data or the destination may predicted based on the logistical data. For example, when the vehicle occupant 202 books an appointment with a medical office, a calendar invite may be created for the vehicle occupant's online calendar to correspond to the appointment. The data receiving module 114 may predict that the destination is a medical building upon receiving the appointment with the medical office. The prediction may be based on one or more of historical data, user patterns, and trend analysis. For example, historical data may and/or user patterns may indicate that when an appointment is received by the online calendar from the medical office that the vehicle occupant 202 drives to the medical office building at the appointment time. Accordingly, the historical data, user patterns, and trend analysis may be specific to the vehicle occupant 202. In another embodiment, the historical data, user patterns, and trend analysis may be crowd sourced from multiple users. Continuing the example from above, even if the vehicle occupant 202 has not traveled to the medical office building before, the data receiving module 114 may predict that the medical office building is the destination based on the historical data, user patterns, and trend analysis of other users. Accordingly, the data receiving module 114 may receive the destination or predict the destination.

Similarly, a desired arrival time may be given in the logistical data or predicted by the data receiving module 114. For example, the desired arrival time may be received from the user through user input or predicted based on historical data, user patterns, and trend analysis, as discussed above.

The estimation module 116 estimates an estimated arrival time based on the logistical data. For example, the estimation module 116 may use the destination or the predicted destination to calculate the estimated arrival time based on navigation data. The navigation data may be from the navigation system 124. For example, the navigation system 124 may use positioning information to determine the position of vehicle 200 relative to the destination. In some embodiments, the navigation system 124 may provide the vehicle occupant 202 with on-demand maps of based, for example, positioning technology such as satellite navigation (GPS, Galileo, Glonass, etc.) or as some function of Wi-Fi mapping, GSM-based cell signal mapping, RFID tracking, etc.

The navigation data may also include expected average speed of vehicle 200, the actual average speed of vehicle 200, the time of day during which vehicle 200 is traveling, the average time of a trip from the origin to the destination along a route based upon prior travel, and weather conditions, among others. The estimation module 116 may also account for slow or stationary intervals along the route, which may impact the estimated arrival time. The slow intervals may include congested areas, construction zones, etc. The stationery intervals may include mandatory driver rest periods, allocated time to perform tasks at a location, overnight stays, scheduled or unscheduled maintenance, weigh-ins, or other intervals when vehicle 200 is not moving.

In addition to the navigation data, the estimated arrival time to the destination may be estimated based on traffic data. The traffic data may be accessed through the traffic database 148 by VCD 102 or the vehicle systems 122, such as the navigation system 124. The traffic data may be incorporated into the initial estimation or as an update to the estimation of the estimated arrival time. Accordingly, the estimation module 116 may continually update the estimated arrival time based on updates to the logistical data, navigation data, and/or traffic data.

The determination module 118 compares the estimated arrival time to the desired arrival time and makes an arrival determination. In particular the determination module 118 determines if the estimated arrival time will occur a threshold amount of time after the desired arrival time. The threshold amount of time may be a null time so that there is effectively no threshold. When the threshold amount of time is a null time, the determination module 118 determines when the estimated arrival time will occur directly after the desired arrival time. In another embodiment, the threshold time may be an amount of time greater than zero.

When the threshold amount of time is greater than zero, the threshold amount of time may be predetermined or based on the trip. The vehicle occupant 202 may set the threshold amount of time as a 5 minutes, for example, if the vehicle occupant 202 finds a 5 minute threshold acceptable or is building in a buffer based on the perceived accuracy of the estimation. Suppose the estimated time of arrival is calculated using a known route, but the vehicle occupant 202 is aware of a shortcut. Initially it may appear that vehicle 200 will arrive at least the threshold amount of time after the desired arrival time. Accordingly, the vehicle occupant 202 may set the threshold amount of time based on the expectation of being able to make up time on route using the shortcut. In another embodiment, the threshold amount of time is based on a predetermined percentage of an estimated duration of the trip.

Furthermore, the threshold amount of time may be variable. In one embodiment, the threshold amount of time may be larger at the outset of the trip when estimated arrival time is based on more variables, and become smaller as the vehicle 200 approaches the destination. For example, the threshold amount of time may be a predetermined percentage of or proportional to the estimated duration of the trip. Accordingly, the threshold amount of time may change over the course of the trip.

When it is determined that the estimated arrival time will occur at least the threshold amount of time after the desired time, the control module 120 causes one or more of the vehicle systems 122 to be altered according to an experience attribute. For example, the control module 120 may cause the infotainment system 126 to prevent the estimated arrival time from being displayed on the vehicle display 128.

Suppose that the estimated arrival time will occur within at least the threshold amount of time of the desired arrival time, then, as shown in FIG. 2A, the vehicle display 128 has an estimated arrival time display area 204 where the estimated arrival time is displayed. Conversely, in FIG. 2B, the estimated arrival time display area 204 is blank in response to the determination that the estimated arrival time will occur at least the threshold amount of time after the desired time. Thus, when it is determined that the estimated arrival time will occur at least the threshold amount of time after the desired time, the estimated arrival time may no longer displayed so as not to cause the vehicle occupant 202 to become anxious. The decision to display the estimated arrival time or not is based on an experience attribute associated with the determination that the estimated arrival time will occur within at least the threshold amount of time of the desired arrival time. Accordingly, the vehicle systems 122 change the presentation of data to the vehicle occupant 202 to alter the experience of the vehicle occupant 202 based on the associated experience attribute.

In addition to not displaying the estimated arrival time, other vehicle systems 122 may be initiated according to one or more additional experience attributes to relax the vehicle occupant 202. For example, the estimated arrival time display area may be replaced by another feature, image, or icon associated with the vehicle systems 122. In one embodiment, the one or more experience attributes may include playing relaxing music when the estimated arrival time will occur at least the threshold amount of time after the desired arrival time. Accordingly, the estimated arrival time display area 204 may be replaced by an audio icon (not shown) that can be selected by the vehicle occupant 202 to change settings of the audio system 130. In another embodiment, the estimated arrival time display area 204 may be replaced by a light icon (not shown) that can be selected by the vehicle occupant 202 to change settings of the light system 132.

The control module 120 may identify an experience attribute, multiple experience attributes, or additional experience attributes in order to control the vehicle systems 122. For example, the experience attributes may be identified by the control module 120 based on a gap amount of time between the estimated arrival time and the desired arrival time. For example, the longer the gap time the more experience attributes may be used to control one or more vehicle systems 122 to provide additional relaxation to the vehicle occupant 202.

In some embodiments, the experience attributes may be customized to the vehicle occupant 202. The vehicle occupant 202 may be identified using input data from the vehicle occupant 202, for example, entered at the vehicle display 128. Additionally or alternatively, the vehicle occupant 202 may be identified using physiological data about one or more vehicle occupants of the vehicle 200 sensed by the vehicle sensors 134. Physiological data can include, but is not limited to, heart information, such as, heart rate, heart rate pattern, blood pressure, oxygen content, among others. Physiological data can also include brain information, such as, electroencephalogram (EEG) measurements, functional near infrared spectroscopy (fNIRS), functional magnetic resonance imaging (fMRI), among others. Physiological data can also include digestion information, respiration rate information, salivation information, perspiration information, pupil dilation information, body temperature, muscle strain, as well as other kinds of information related to the autonomic nervous system or other biological systems of the vehicle occupant. In some embodiments, physiological data can also include behavioral data, for example, mouth movements, facial movements, facial recognition, head movements, body movements, hand postures, hand placement, body posture, gesture recognition, among others.

To recognize the vehicle occupant 202, the physiological data can also include recognition data (e.g., biometric identification) used to identify the vehicle occupant 202. For example, recognition data can include a pre-determined heart rate pattern associated with a vehicle occupant 202, eye scan data associated with a vehicle occupant 202, fingerprint data associated with a vehicle occupant, among other types of recognition data. It is appreciated that the recognition data and other types of physiological data can be stored at various locations (e.g., the device memory 104, the device data store 106, etc.) and accessed by the VCD 102.

Once the vehicle occupant 202 is identified, the experience attributes specific to the identified vehicle occupant 202 may be employed to customize the vehicle occupant's experience. For example, the vehicle occupant 202 may find electronic dance music soothing. Accordingly, an experience attribute may include initiating the audio system 130 to play electronic dance music. In another embodiment, the experience attributes may include group specific experience attributes. For example, suppose a first vehicle occupant and a second vehicle occupant are present in the vehicle 200. The first vehicle occupant may find electronic dance music soothing while the second vehicle occupant finds electronic dance music grating. Accordingly, the experience attributes may include a group-specific experience attributes that indicate that when a group is present in the vehicle, that a group action be taken to affect the one or more vehicle systems 122. For example, the group-specific experience attribute may cause the audio system 130 to play show tunes music, which both the first vehicle occupant and the second vehicle occupant find relaxing.

As described, the operation of the vehicle systems 122 are altered based on the experience attributes. The experience attributes may cause the vehicle systems 122 to not take an action (e.g., not display the estimated time of arrival) or to take and action (e.g., play music). Moreover, as described, the experience attributes may be specific to a single vehicle occupant or a group of vehicle occupants. The experience attributes may include settings, control data, instructions, etc. to assert control over the vehicle systems 122. Accordingly, based on the determination the vehicle systems 122 are altered based on the experience attributes to alter the experience of the vehicle occupant 202.

II. Methods for Providing Remote Control

Figure 3:
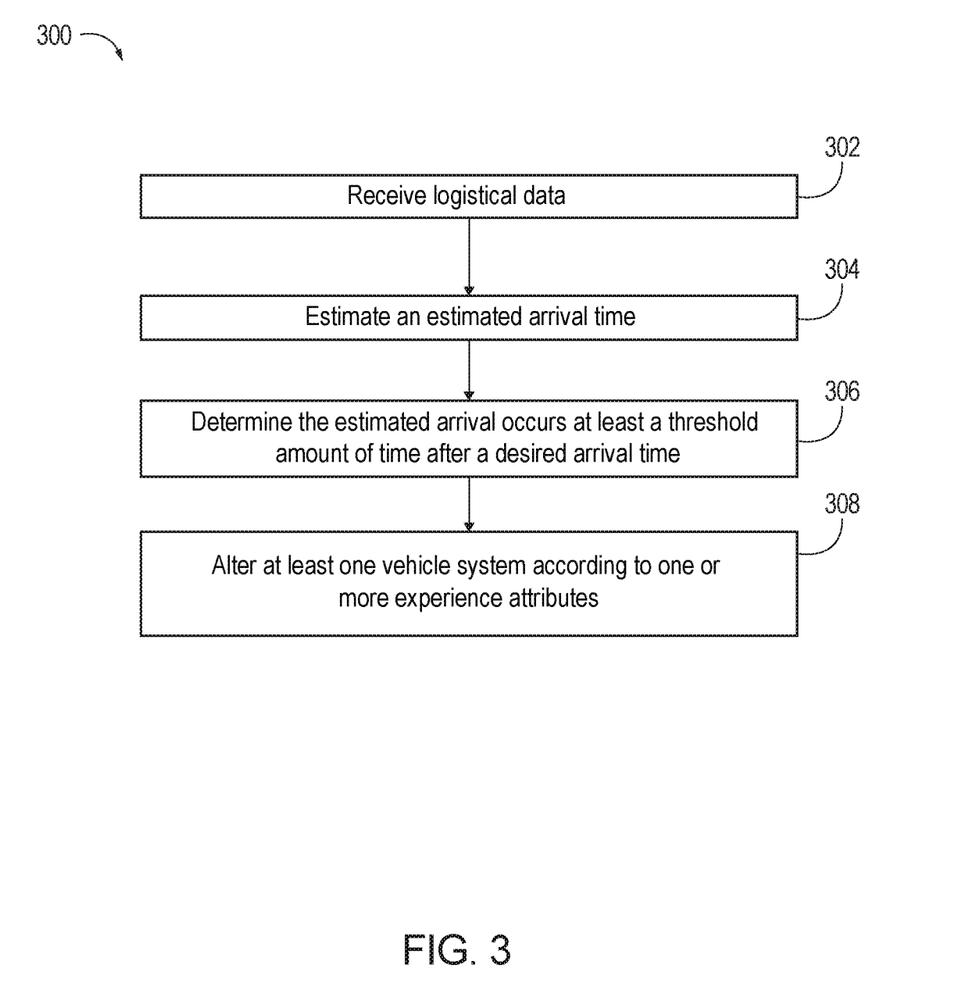
FIG. 3 is a process flow diagram of a method for using experience attributes to control vehicle systems according to an exemplary embodiment.

Referring now to FIG. 3, a method 300 for providing a mobility service will now be described according to an exemplary embodiment. FIG. 3 will be described with reference to FIGS. 1 and 2. The illustrative examples discussed herein are exemplary in nature and varying vehicles, destinations, and experience attributes may be implemented.

With reference to FIG. 3, at block 302, the method 300 includes receiving logistical data. In some embodiments, including a destination and a desired arrival time for a trip of a vehicle occupant. The trip includes a route between an origin and a destination being traversed by a vehicle 200 having a vehicle occupant 202. The amount of time that it takes the vehicle 200 to traverse the route is defined as the trip duration. The logistical data includes this information (e.g., origin, destination, route, trip duration) as logistical data. The logistical data also includes information about the purpose of the trip. For example, if the trip is based on an event, the event data including a start time, appointment time, the time an event is scheduled to start, and a time of departure, among others. The logistical data is aggregated by the data receiving module 114.

At block 304, the method 300 includes estimating an estimated arrival time at the destination based on navigation data. The estimation module 116 uses the logistical data to calculate an estimated time of arrival. The estimated time of arrival may also be based on real-time traffic data received from the traffic database 148. The estimation module 116 may periodically update the estimated arrival time as the logistical data and traffic data are updated.

At block 306, the method 300 includes determining that the estimated arrival time will occur at least a threshold amount of time after the desired arrival time. In some embodiments, the determination module 118 may compare the estimated arrival time to a desired arrival time received with the logistical data. The determination module 118 may predict a desired arrival time based on the logistical data. For example, suppose the vehicle occupant's calendar has a recurring weekly event on Thursdays. Even if a specific time is not listed on the vehicle occupant's calendar, the determination module 118 may predict the event start time based on the historical data associated with the other events from previous Thursdays.

In the comparison of the estimated arrival time to the desired arrival time, the determination module 118 considers a threshold amount of time. The threshold amount of time is an amount of time that the vehicle occupant 202 may find acceptable to arrive at the destination even after the desired arrival time. For example, suppose the vehicle occupant 202 is dropping off a student at school. Although the school drop-off time may begin at 8:20 am, the student may not be considered tardy until 8:30 am. Accordingly, while the desired arrival time may be 8:20 am the threshold amount of time may be 10 minutes, the difference between 8:20 am and 8:30 am. By comparing the estimated arrival time to a desired arrival time, the determination module 118 may determine that the estimated arrival time will occur within the threshold amount of time after the desired time. For example, if the vehicle occupant 202 arrives to drop off the student at school at 8:25 am, the vehicle occupant has arrived after the desired arrival time but within the threshold. Continuing the example, the determination module 118 may determine that the vehicle 200 will arrive at the destination at 8:40 am, more than the threshold amount of time after the desired arrival time.

Figure 4:
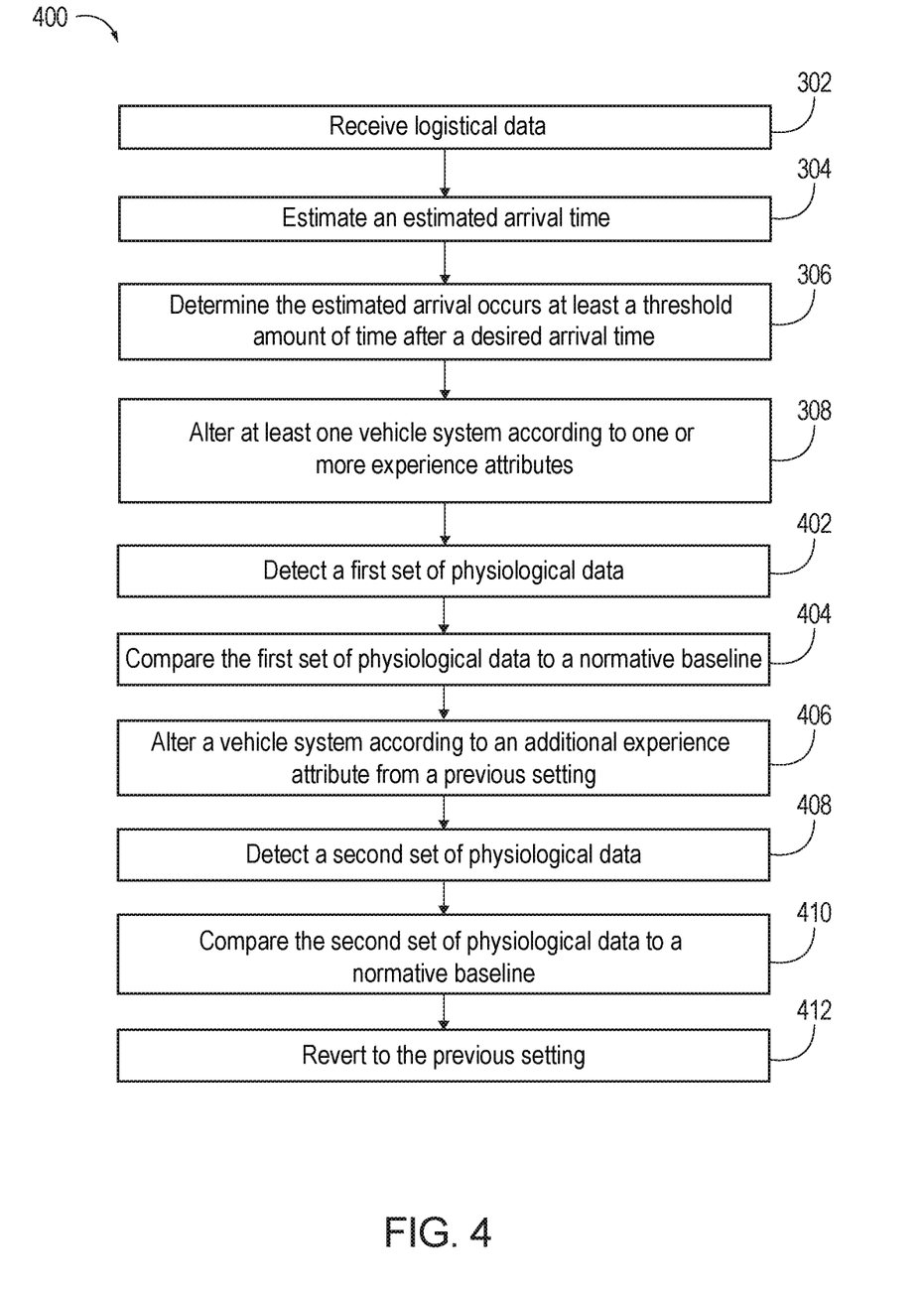
FIG. 4 is a process flow diagram of a method for using experience attributes associated with physiological data of the vehicle occupant to control vehicle systems according to an exemplary embodiment.

At block 308, the method 300 includes altering at least one vehicle system according to one or more experience attributes. The experience attributes may be identified by the control module 120 based on the determination that the estimated arrival time will occur a threshold amount of time after the desired arrival time. In particular, the experience attributes may be identified based on the determination, gap time, and/or the physiological data of the vehicle occupant, among others. The experience attributes are used to control one or more vehicle systems 122. For example, an experience attribute may include one or more settings for one or more vehicle systems 122. Therefore, one experience attribute may have settings, control data, instructions, etc. for multiple vehicle systems 122. Accordingly, the experience attributes are used to change vehicle systems 122 in order to alter the vehicle occupant's experience Referring now to FIG. 4, a method 400 for using experience attributes to control vehicle systems 122 will now be described according to an exemplary embodiment. FIG. 4 will be described with reference to FIGS. 1-3. The illustrative examples discussed herein are exemplary in nature and varying vehicles, destinations, and experience attributes may be implemented. In particular, the blocks 302, 304, 306, and 308 of FIG. 4 correspond to the blocks 302, 304, 306, and 308 of FIG. 3 and function in a similar manner.

In some embodiments, the control module 120 may assess how effective the experience attributes have been to relax the vehicle occupant 202. In some embodiments, the effectiveness may be determined based on the vehicle occupant's physiological data. For example, at block 402, the vehicle sensors 134 detect a first set of physiological data of the vehicle occupant 202 after a vehicle system has been altered according to a first experience attribute. At block 404, the first set of physiological data is compared to a normative baseline. The normative baseline may specific to the vehicle occupant 202 or be based on a predetermined baseline. For example, suppose the vehicle occupant 202 may have a normal heart rate of 60 beats per minute (BPM), however, the first physiological dataset may reflect a vehicle occupant 202 currently has a heart rate of 75 BPM. The determination may be made if the physiological data is greater than the normative baseline, within a certain range, within a standard deviation of the normative baseline, etc.

At block 406, the method 400 includes using an additional experience attribute to make an additional alteration to a vehicle system. Accordingly, a vehicle system is altered from a previous setting based on the comparison of the first set of physiological data to the normative baseline. For example, the audio system 130 may be controlled to play relaxing music according to the additional experience attribute.

At block 408, the method 400 includes detecting a second set of physiological data of the vehicle occupant 202 after a vehicle system has been altered according to the additional experience attribute, a second experience attribute. In one embodiment, the second set of physiological data is detected after a predetermined relaxation time associated with the at least one additional experience attribute. At 410, the second set of physiological data is compared to the normative baseline. The normative baseline may specific to the vehicle occupant 202 or be based on a predetermined baseline. A determination may be made that the second set of physiological data better approximates the normative baselines than the first set of physiological data. Continuing the example from above, suppose that the second set physiological dataset may reflect a vehicle occupant 202 now has a heart rate of 65 BPM after the audio system 130 was controlled to play music according to the additional experience attribute.

In response to the second set of physiological data returning toward the normative baseline, at block 412, the control module 120 may control the vehicle system to revert to one or more previous settings. Accordingly, the vehicle systems 122 can be controlled to alter the settings of vehicle system 122 based on how effective the alterations are at relaxing the vehicle occupant 202. Therefore, the experience attributes can progressively address the experience of the vehicle occupant 202 by altering the vehicle systems 122 in stages. In this manner, the vehicle 200 can help anticipate negative reactions of the vehicle occupant 202 and make accommodations.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling a vehicle system using experience attributes, the method comprising:
   receiving logistical data for a trip of a vehicle occupant in a vehicle;
   estimating an estimated arrival time using the logistical data based on navigation data;
   determining that the estimated arrival time will occur at least a threshold amount of time after a desired arrival time;
   identifying an experience attribute based on the determination, wherein the vehicle system is an infotainment system and the experience attribute is a setting of the infotainment system; and altering the infotainment system to prevent the estimated arrival time from being displayed based on the experience attribute in response to the determination that the estimated arrival time will occur at least the threshold amount of time after the desired arrival time.

2. The computer-implemented method of claim 1, wherein the logistical data is based on one or more of historical data, user patterns, and trend analysis.

3. The computer-implemented method of claim 1, further comprising:
generating a query for a remote server associated with the vehicle occupant, wherein the query includes a request for the logistical data.

4. The computer-implemented method of claim 1, wherein a destination and the desired arrival time are received as the logistical data.

5. The computer-implemented method of claim 1, wherein a destination or the desired arrival time is predicted based on one or more of historical data, user patterns, and trend analysis.

6. The computer-implemented method of claim 1, further comprising:
detecting a first set of physiological data of the vehicle occupant in response to determining that the estimated arrival time will occur at least the threshold amount of time after the desired arrival time;
comparing the first set of physiological data to normative baselines of the vehicle occupant; and
altering the infotainment system based on at least one additional experience attribute from a previous setting based on the comparison.

7. The computer-implemented method of claim 6, further comprising:
detecting a second set of physiological data of the vehicle occupant;
determining that the second set of physiological data is closer in value to the normative baselines than the first set of physiological data; and
controlling the infotainment system to revert from the additional experience attribute to the previous setting.

8. A system for controlling an infotainment system using experience attributes, the system comprising:
a data receiving module, implemented via a processor, receiving logistical data including a destination and a desired arrival time for a trip of a vehicle occupant;
an estimation module, implemented via the processor, estimating an estimated arrival time at the destination based on navigation data;
a determination module, implemented via the processor, determining that the estimated arrival time will occur at least a threshold amount of time after the desired arrival time; and
a control module, implemented via the processor, identifying an experience attribute based on the determination and altering the infotainment system to prevent the estimated arrival time from being displayed based on the experience attribute in response to the determination that the estimated arrival time will occur at least the threshold amount of time after the desired arrival time.

9. The system of claim 8, wherein the control module, implemented via the processor, further identifies an additional experience attribute and alters a second vehicle system, different than the infotainment system, based on the additional experience attribute.

10. The system of claim 8, wherein the data receiving module, implemented via the processor, further generates a query for a remote server associated with the vehicle occupant, wherein the query includes a request for the logistical data.

11. The system of claim 8, wherein the threshold amount of time is based on a predetermined percentage of an estimated duration of the trip.

12. The system of claim 8, wherein
the data receiving module, implemented via the processor, further receives a first set of physiological data of the vehicle occupant in response to determining that the estimated arrival time will occur at least the threshold amount of time after the desired arrival time;
the determination module, implemented via the processor, further compares the first set of physiological data to normative baselines of the vehicle occupant; and
the control module, implemented via the processor, further alters the infotainment system based on at least one additional experience attribute from previous settings based on the comparison.

13. The system of claim 12, wherein
the data receiving module, implemented via the processor, further receives a second set of physiological data of the vehicle occupant;
the determination module, implemented via the processor, further determines that the second set of physiological data is closer in value to the normative baselines than the first set of physiological data; and
the control module, implemented via the processor, further controls controlling the infotainment system to revert from the additional experience attribute to the previous settings.

14. A non-transitory computer-readable storage medium storing instructions that, when executed by a computer, causes the computer to perform a method for controlling a vehicle system using experience attributes, the method comprising:
receiving logistical data associated with a trip of a vehicle occupant;
estimating an estimated arrival time based on navigation data;
determining that the estimated arrival time will occur at least a threshold amount of time after a desired arrival time;
identifying an experience attribute based on the determination, wherein the vehicle system is an infotainment system and the experience attribute is a setting of the infotainment system; and
altering the infotainment system to prevent the estimated arrival time from being displayed based on the experience attribute in response to the determination that the estimated arrival time will occur at least the threshold amount of time after the desired arrival time.

15. The non-transitory computer-readable storage medium of claim 14, wherein the logistical data is based on one or more of historical data, user patterns, and trend analysis.

16. The non-transitory computer-readable storage medium of claim 14, wherein the instructions, when executed by the computer, further cause the computer to perform:
generating a query for a remote server associated with the vehicle occupant, wherein the query includes a request for the logistical data.

17. The non-transitory computer-readable storage medium of claim 14, wherein the desired arrival time is predicted based on one or more of historical data, user patterns, and trend analysis.

18. The non-transitory computer-readable storage medium of claim 14, wherein the threshold amount of time is based on a predetermined percentage of an estimated duration of the trip.

\* \* \* \* \*